United States Patent Office 3,061,515
Patented Oct. 30, 1962

3,061,515
METHANE SULFONATES OF TELOMYCINS
Oliver B. Fardig, Fayetteville, N.Y., assignor to Bristol-Myers Company, New York, N.Y., a corporation of Delaware
No Drawing. Filed May 9, 1960, Ser. No. 27,514
6 Claims. (Cl. 167—65)

This invention relates to novel, water-soluble derivatives of the antibiotic telomycin and, more particularly, to telomycin methanesulfonates.

Telomycin is an antibiotic whose physical, chemical and biological properties, preparation and uses are all described in the literature; see Misiek et al., "Telomycin, a New Antibiotic," Antibiotics Annual, 1957–1958, pages 852–855; Tisch et al., "Pharmacological Studies With Telomycin," Antibiotics Annual, 1957–1958, pages 863–868, and Gourevitch et al., "Microbiological Studies on Telomycin," Antibiotics Annual, 1957–1958, pages 856–862. The organism producing telomycin has been identified as a new strain of Streptomyces canus. Two cultures of the organism have been deposited in the American Type Culture Collection, Washington, D.C., and added to its permanent collection of microorganisms as A.T.C.C. 12646 and 12647.

Telomycin has been shown to have low toxicity and potent activity against bacteria, particularly Gram-positive bacteria. Telomycin appears to be very poorly absorbed upon oral administration and has, therefore, been administered primarily by the intramuscular route. It is, of course, desirable in the preparation of a therapeutic product that the antibiotic used be as pure as possible. It has been found desirable to purify telomycin by recrystallizing amorphous telomycin from water by the gradual cooling of a hot water solution of amorphous telomycin solids. It has been found, however, upon purification of such amorphous telomycin solids that the aqueous solubility of telomycin greatly decreases as purification is effected. When purified as described above, telomycin has a solubility in water at room temperature of less than 1 mg./ml. and is in a crystal form which has been designated type III. Additional information on the preparation and properties of type III telomycin is given below. It has also been found that the absorbability in the body of recrystallized, purified telomycin type III is very low and consequently the blood levels obtained upon injection of such purified telomycin are very low. In addition, the injections are considered to be very painful by the patent, no matter which type of telomycin is used.

It is the object of the present invention to provide a series of nontoxic, highly water-soluble derivatives of telomycin which, upon parenteral administration to man and animals, will not be painful and will produce immediate absorption into the blood stream of amounts of telomycin which are substantially greater than heretofore available.

The objects of the present invention have been achieved by the provision, according to the present invention, of telomycin methane sulfonate and non-toxic pharmaceutically acceptable metal salts thereof, including especially alkali metal salts, such as sodium and potassium, and also calcium, aluminum, magnesium, and ammonium salts.

There is thus provided by the present invention the non-toxic, water-soluble, efficiently parenterally absorbed reaction product of telomycin and sodium hydroxymethane sulfonate. Sodium hydroxymethane sulfonate is also called sodium formaldehyde bisulfite.

The present invention includes the process of preparing telomycin methane sulfonate which comprises mixing telomycin, preferably type III, with from an equal weight to twice its weight of sodium hydroxymethane sulfonate in a small amount of water, e.g. about four times the weight of telomycin, adjusting the pH to about .7 and heating to about 100° C., preferably with stirring over a period of about one hour to produce the desired reaction product, telomycin methane sulfonate; if desired, the reaction product is isolated as a solid by slowly evaporating the reaction mixture to dryness at room temperature and atmospheric pressure.

The following examples are for purposes of illustration only and not of limitation.

EXAMPLE I

Equal quantities of telomycin, type III, and sodium hydroxy-methane sulfonate were mixed with a small amount of water (4–5 times the weight of telomycin), adjusted to pH 7, and heated to near 100° C. with continued stirring over a period of one hour. During this time the original milky appearance of the mixture (due to the suspension of insoluble type III telomycin) changed to clear light tan syrup. The syrup was slowly dried to a pale tan solid and used for testing. This procedure was followed in its essential details for a number of runs, except for two runs in which the weight of sodium hydroxymethane sulfonate was twice the weight of telomycin. Analytical data of represenative batches of the reaction product thus produced are given below:

|  | Properties of purified telomycin | Properties of reaction product batch No. | | | |
| --- | --- | --- | --- | --- | --- |
|  |  | 146 | 11–2S | 147 | 150 |
| Biopotency (u./m7.) | 1,500 | 600 | 863 | 1,100 | 830 |
| Methane sulfonate/telomycin (molar proportion): |  |  |  |  |  |
| Starting mixture | | 12/1 | 12/1 | 24/1 | 24/1 |
| Product (estimated) | | 4/1 | 2/1 | 2.4/1 | 4/1 |
| C (corr. for volatiles) | 55.0 | 33.75 | | 45.85 | 38.10 |
| H (corr. for volatiles) | 5.16 | 4.15 | | 5.10 | 4.66 |
| N (corr. for volatiles) | 14.2 | 8.57 | | 11.6 | 9.12 |
| S (corr. for volatiles) | 0 | 11.57 | | 5.07 | 8.50 |
| Metal (corr. for volatiles) | 0.2 | 8.75 | | 4.05 | 5.83 |
| Volatiles (loss at 80° C.) | 8.43 | 8.1 | | 11.3 | 6.0 |

Biopotency was determined according to the standard bioassay procedure for telomycin, pure telomycin having a potency of 1600 u./mg.

Methane sulfonate was determined by analysis for formaldehyde according to the chromotropic acid procedure.

Metal was calculated as sodium from the determination of sulfated ash.

Some study of solubility indicated that the reaction product was different from each of its component parts. Telomycin, type III, was very insoluble in water but somewhat soluble in methanol. Sodium hydroxymethanesulfonate was very soluble in water and insoluble in methanol. The reaction product was very soluble in water and moderately soluble in methanol. No quantitative measure of solubility could be made however because the telomycin methane sulfonate dissociated slowly in water solution and precipitated out the insoluble type III telomycin.

EXAMPLE II

Telomycin (5.0 g.; bioassaying 1400 units/mgm.), sodium formaldehyde bisulfite (5.0 g.) and water (20 ml.) were mixed, giving a white slurry of solids, and heated on a steam cone. After about one hour the clear solution was cooled. The addition of 150 ml. methanol left a clear solution which was lyophilized to give the reaction product (batch 146) bioassaying 680 units/mgm.

EXAMPLE III

Telomycin type III (10 g.) was mixed with 20 ml. water and the pH was adjusted from 3.0 to 7.0; the telomycin did not dissolve.

Sodium formaldehyde bisulfite (10 g.) was dissolved in 20 ml. water.

These two mixtures were combined and heated one hour on the steam bath. After slight cooling, the gradual addition of 20 ml. methanol while keeping the solution warm in a hot water bath at first precipitated a solid which then redissolved. After standing two days at room temperature, the solution was dried in air at room temperature to give the solid reaction product as 18.2 g. crystalline material (batch 146) which was soluble in water and in methanol and in 90% aqueous methanol and bioassayed 600–650 units/mgm., and contained 2.47 micromoles formaldehyde per mgm., indicating the reaction of four moles of sodium formaldehyde bisulfite with each molecule of telomycin.

EXAMPLE IV

Sodium methane sulfonate (200 g.) was dissolved in 350 ml. water and this solution was added to a mixture in 350 ml. of water of telomycin type III (100 g.) at room temperature. The mixture was adjusted to pH 7.0 with sodium hydroxide, showing no change, and then stirred for one hour on a hot plate, cooled slowly and stored at 10° C. overnight.

The reaction product precipitated and was collected by filtration, dried in vacuo and found to weigh 143 g., to have a molar ratio of sulfonate to telomycin of 3.8 by formaldehyde analysis, to bioassay 740–830 units/mgm. and to give the other analytical values listed under Example I for batch 150.

Intramuscular administration in man of doses of 100–400 mgm. of this reaction product in extemporaneously prepared aqueous solutions having a volume of 1–2 ml. was not painful and give high blood levels of telomycin activity at one, two and four hours after administration.

*Preparation of Crystalline Forms of Telomycin*

Three forms of crystalline telomycin solids have been prepared and designated type I, type II, and type III, according to their water solubility and their mode of preparation. Type I material is solid crystallized from a concentrated butanol extract of a water solution of the antibiotic. This product was moderately soluble in water. Type II material is solid crystallized from a concentrated butanol extract of the antibiotic following pretreatment with .03 N HCl in butanol or methanol by refluxing for about two hours. This product is very soluble in water. Type III material is a solid crystallized from water by gradual cooling of a hot water solution. It may also be prepared by allowing aqueous suspensions or solutions of type I and type II materials to stand after seeding with crystals.

(a) *Preparation of type III crystals.*—Telomycin was crystallized from water by solution at elevated temperature and very gradual cooling, with seeding and continuous agitation during the cooling period. Twenty-five grams of solid type I crystals precipitated in the plant from butanol were mixed with 1250 ml. of water. The pH was 5.8. All solid was not dissolved. The mixture was heated to 65–70° C. to give a clear solution which was filtered hot to remove extraneous solid. The solution was immersed in a large water bath at 75° C. and allowed to cool to room temperature very slowly. The solution was mixed continuously and was seeded with crystals when about 55° C. Precipitation commenced as amorphous solid which gradually became completely crystalline. After 16 hours' mixing, the crystals were separated by filtration and dried under vacuum. Twenty-one and four tenths grams of white crystalline solid were obtained. This material was further dried at 100° C. for 16 hours at 10 mm. mercury pressure. It was designated as 127 and used in comparisons with other types of crystals.

A portion of sample was recrystallized. It was mixed with water at 2 grams per 100 ml. and heated. The mixture lost turbidity at about 75° C. but all solid had not dissolved at 95° C. The clear solution was separated from insoluble solids and allowed to cool slowly in a water bath initially at 85° C. After 16 hours mixing, sample was cooled in ice for 4 hours, then filtered and dried. Potency of the material was 1900 units/mg.

Type I and type II crystals, samples 125 and 126, were mixed with water to form solutions of 20 mg./ml. concentration, warmed to about 60° C., and cooled slowly to room temperature over a period of 3 hours. Type III crystals precipitated during the cooling period. The solubility of telomycin in the mother liquor following 16 hours standing at room temperature, was 1 to 2 mg./ml.

(b) *Preparation of type II crystals.*—Twenty-five grams of telomycin were dissolved in 250 ml. of methanol to which 7.5 ml. of 1 N HCl had been added. The solution was refluxed for two hours. Water was added and the solution adjusted to pH 3.7. The solution was extracted with butanol and the butanol extract concentrated under vacuum. The extract was warmed to 65° C. and seeded with type II crystals and allowed to cool gradually. The crystalline precipitate was separated, dried and assayed. Eight grams of material were recovered. This material was further dried at 100° C. for 16 hours at 10 mm. mercury pressure and designated as sample 129.

Crystalline solid which was very soluble in water was prepared by reflux of telomycin with dilute HCl in water solution. The method was the same as described above except that water was substituted for methanol in the reflux step. Solid precipitated from the concentrated butanol extract without seeding. The solubility in water indicated this material to be type II crystals.

(c) *Preparation of type I crystals.*—Crystalline telomycin type I prepared by the concentration of a butanol extract of a water solution of the antibiotic was dried at 100° C. for 16 hours at 10 mm. mercury pressure and labeled sample 128. It was used for comparison with other types of crystal forms.

*Comparison of Types I, II and II*

Physical properties of the three crystal types were compared to determine what differences exist between the various crystal types. Samples 127, 128 and 129 were used as representative of each crystal form. The observations are listed below:

was greatly increased upon heating. For maximum precipitation, cooling in ice water was necessary.

| Analytical determination | Type I (128) | Type II (129) | Type III (127) |
|---|---|---|---|
| Re 135 | | | |
| Volatiles (Abderhalden-4 hrs. at 100° C. vac. <20 mg. Hg), percent | 1.4 | 1.5 | 1.6. |
| Moisture (Carl Fischer), percent | 1.9 | 2.4 | 2.1. |
| Butanol (gas chromatography), percent | 0.97 | 2.1 | 0.20. |
| elemental analysis (corr. for volatiles), percent: | | | |
| C | 55.80 | 56.20 | 56.14. |
| H | 5.40 | 6.62 | 6.12. |
| N | 14.10 | 13.50 | 13.20. |
| S | Nil | Nil | Nil. |
| Cl | Nil | Nil | Nil. |
| Residue | 3.1 | 0.53 | 2.9. |
| Ultraviolet spectrum (0.1 mcg./ml. in 0.1 N HCl): | | | |
| $E_{1\ cm.}^{1\%}$ of absorption peaks | 169 at 333 m$\mu$, 116 at 274 m$\mu$ | 174 at 334 m$\mu$, 128 at 275 m$\mu$ | 158 at 335 m$\mu$, 105 at 275 m$\mu$. |
| Infrared spectrum | All spectra are the same | | |
| Melting point | Decomp. (turns tan) 230–240° C. | Decomp. (turns tan) 220–230° C. | Decomp. (turns tan) 235–240° C. |
| Specific rotation: | | | |
| 0.05 N HCl | | −122.2 | −115.6. |
| | | −121.1 [1] | |
| NaOH, pH 11.6 | −116.7 | | |
| MeOH | −13.6 | −15.1 | −12.5. |
| MeOH:H$_2$O (1:1) | −11.3 | −12.3 | −12.6. |
| Microscopic appearance before drying | Long, thin needles, blunt ends, parallel extinction. | Same as Type I | Same as Type I. |
| After vacuum drying | No change | Somewhat fragmented | No change. |
| Solubility [2] in water at room temperature | 5 mg./ml | >100 mg./ml | <1 mg./ml. |
| | | >100 mg./ml [1] | |
| Methanol | 20 mg./ml | 20 mg./ml | 20 mg./ml. |
| Methanol: water (1:1) with HCl to 0.05 N | >80 mg./ml | >80 mg./ml | >80 mg./ml. |

[1] Crystals from aqueous-acid reflux.
[2] Solubility of Types I and II are crude initial solubility values since solutions precipitate Type III crystals on standing.

*Additional Solubility Data on Type III Crystals*

Some further observations on the solubility of type III telomycin (127) were made. The crystalline solids were shaken for as long as 16 hours in water at various acid concentrations. At 0.01 N and 0.1 N HCl concentration, the mother liquor assayed 0.2–0.4 mgm./ml. At acid concentrations up to 6 N HCl solubility was less than 1.4 mgm./ml. Precise determinations at the higher acid concentrations were not carried out. In 3 N HCl and more concentrated solutions, a greenish yellow color developed in solution and in undissolved solid. Crude evaluation of solubility was made with a number of solvents by the addition of increments of solid to a milliliter portion of solvent. After shaking, the solubility was estimated by the visual observation of undissolved solids in the tube. The results obtained are listed below.

Solvent: Solid maximum dissolved, mg./ml.
- Ethanol --- 30
- n-Butanol --- <8
- t-Butanol --- <4
- Acetone --- <4
- Formamide --- >40
- Methanol:water (95–5) --- 60
- Ethanol:water (95–5) --- 20
- Butanol:water (90:10) --- <8
- Acetone:water (90:10) --- 50

Solubility varied considerably with temperature and

A comparison of the physical properties of types I, II and III showed no significant differences other than that of solubility in water and alcohol.

By the ultracentrifuge method the molecular weight of telomycin was found to be in the 1700 range.

I claim:

1. A member selected from the group consisting of telomycin methane sulfonate and non-toxic, pharmaceutically acceptable cationic salts thereof.

2. Telomycin methane sulfonate.

3. Sodium telomycin methane sulfonate.

4. A member selected from the group consisting of telomycin III methane sulfonate and non-toxic, pharmaceutically acceptable cationic salts thereof.

5. Telomycin III methane sulfonate.

6. Sodium telomycin III methane sulfonate.

References Cited in the file of this patent

Higuchi et al.: "Reactivity of Bisulfite With a Number of Pharmaceuticals," in JAPhA (Sci. Ed.), vol. XLVIII, No. 9, September 1959, pages 535–540.

Logemann et al.: "Arzneimittel-forsch," vol. 5, pp. 213–21 (1955).